Figure 10:
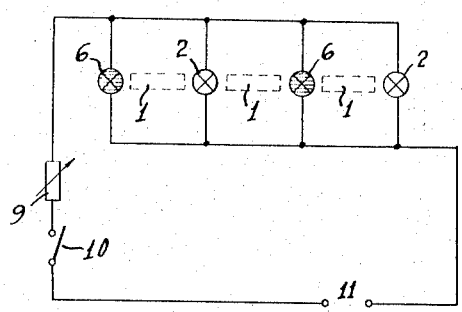

Jan. 31, 1967 H. REPPISCH 3,302,012
LIGHTING SYSTEM UTILIZING THE FLOODLIGHT PRINCIPLE
Filed June 26, 1964 3 Sheets-Sheet 1
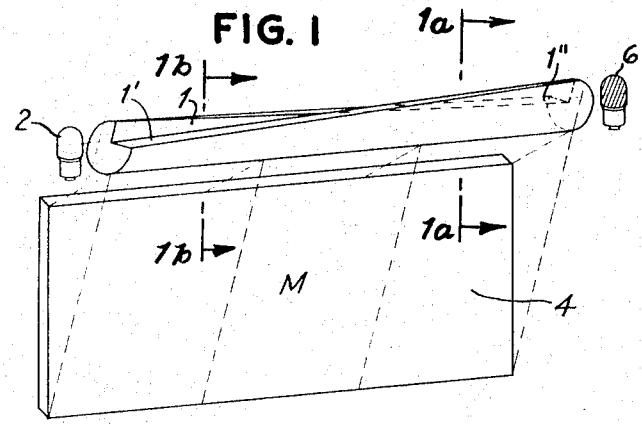
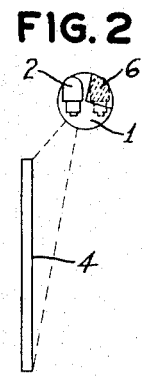
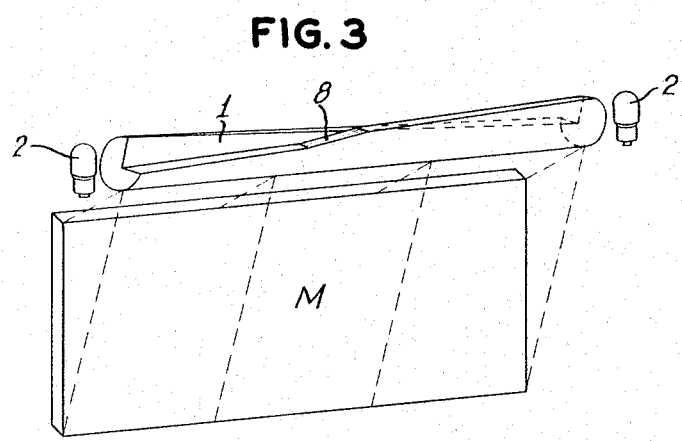
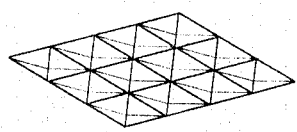
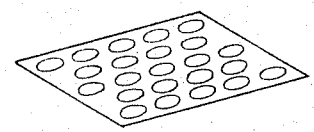
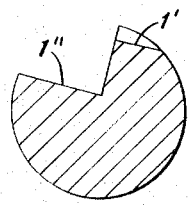
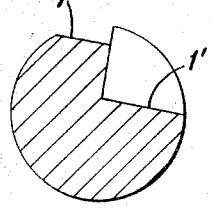
INVENTOR.
Hellmut Reppisch
BY
James E. Bryan
ATTORNEY

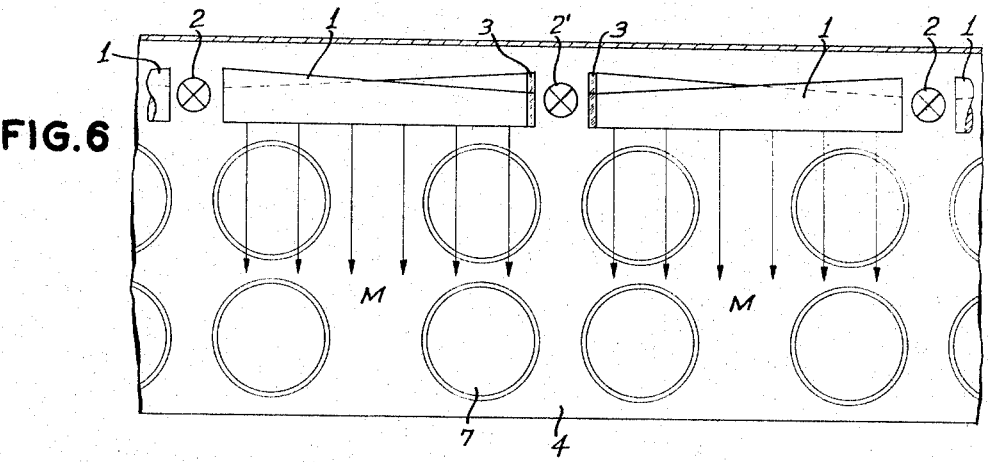
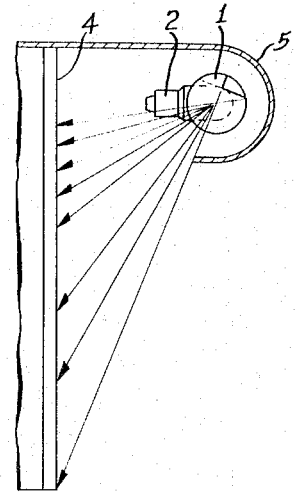
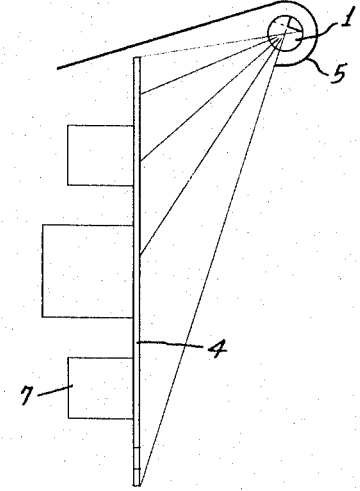
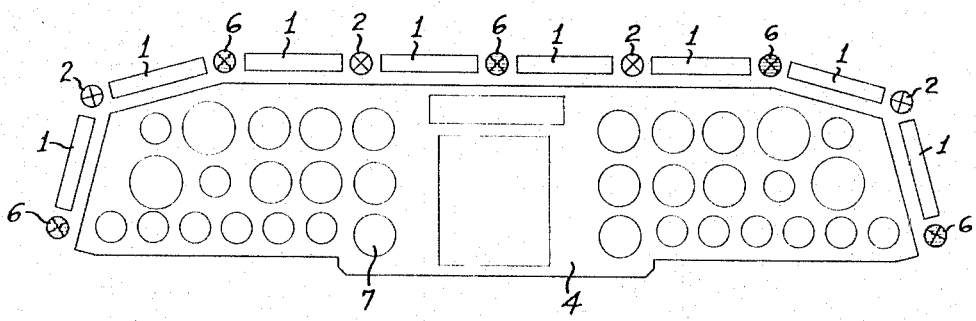

Jan. 31, 1967  H. REPPISCH  3,302,012
LIGHTING SYSTEM UTILIZING THE FLOODLIGHT PRINCIPLE
Filed June 26, 1964

INVENTOR.
Hellmut Reppisch
BY
James E. Bryan
ATTORNEY

United States Patent Office 3,302,012
Patented Jan. 31, 1967

3,302,012
LIGHTING SYSTEM UTILIZING THE FLOODLIGHT PRINCIPLE
Hellmut Reppisch, Immenstaad, Germany, assignor to Dornier-Werke, G.m.b.H., Friedrichshafen am Bodensee, Germany, a corporation of Germany
Filed June 26, 1964, Ser. No. 378,246
Claims priority, application Germany, June 29, 1963, D 41,862
8 Claims. (Cl. 240—8.16)

In the technique of lighting, the problem of illuminating plane surfaces, for example, radio dials and measuring instruments, as well as commercial signs, is frequently encountered. When light sources of conventional design are used for this purpose, large distances between the light sources and the surfaces to be illuminated are required. Such large distances, the use of which is frequently not feasible because of design considerations, can be eliminated by using the floodlight principle. In accordance with this principle, which is known per se, a body of transparent material is laterally illuminated by a light source and, due to total reflection in the interior thereof, this body acts as a light-conductor.

The sides or the surfaces of the light-conducting body may be formed in any specific shape, for example by grinding or milling, and portions thereof may be covered so that the light emanates only at a desired point. Particularly in the illumination of indicating and measuring instruments, as well as radio dials and the like, this space-saving method of illumination has proved satisfactory. Not only plane surfaces such as radio dials but also spatial devices may be illuminated in this manner, if desired.

In illuminating systems utilizing the floodlight principle, it is known to employ certain precautionary measures in order to obtain a uniform illumination of a desired surface. For this purpose, plate, bar, or rod-shaped light-conducting bodies are disposed around a surface to be illuminated and are ground in a special manner. It is also known to obtain colored illumination by coloring the light-conducting bodies or by mounting colored filters between the light source and the light-conducting body. Several light-conducting bodies are also frequently employed and a special color is assigned to each of them so that individual parts of a dial, for example, may be illuminated with a varicolored light.

The present invention relates to the illumination of instruments or dials and the like in observation and operating locations such as the control cabins or cockpits of aircraft, for example. It is known to provide, in an illuminating system operating according to the floodlight principle, several light sources around one instrument or instrument group and to illuminate the entire group by means of a common light-conducting body. Plate, rod, bar, or ring-shaped light-conducting bodies are used for this purpose. In actual practice, one of the requirements is that the degree of brightness or luminosity of the light directed upon the instruments be coordinated or matched with respect to the ambient brightness or luminosity. This is necessary to a particularly great extent in the cockpit or pilot's compartment of aircraft in order to enable the pilot to observe the conditions both inside and outside of the cockpit or compartment without the requirement of a substantial period of time for the pilot's eyes to become accustomed to different lighting conditions. In such systems, it is also desirable to illuminate the instruments selectively with differently colored lights. Thus, in addition to a white illumination for use in illuminating aircraft instruments, for example, an illumination with red light may be advisable or necessary under certain conditions.

An arrangement utilizing differently colored lights with fixed color tones wherein the differently colored lights are switched on and off by simple switching operations is not of optimum utility and is often disadvantageous in many cases. The present invention provides a system utilizing the floodlight principle wherein differently-phased light is irradiated toward both ends of a light-conducting body and in which the aforementioned disadvantages and drawbacks are effectively avoided. In the system of the present invention, the light-conducting body is provided with reflecting surfaces which extend from the extremities thereof and which are formed, by grinding or milling and the like, in the light-conducting body independently of each other. A light source is mounted at each end of the light-conducting body.

Figure 11:
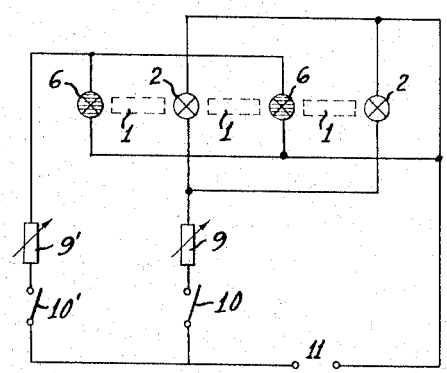
Figure 12:
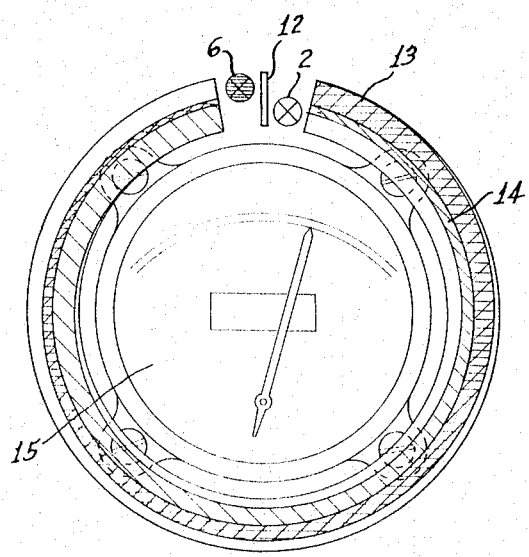
Figure 13:
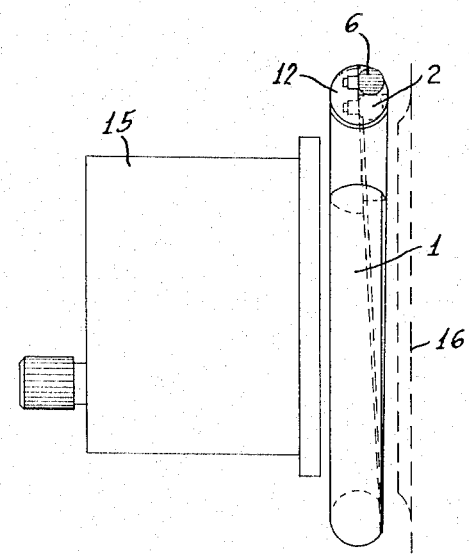

The invention will be further illustrated by reference to the accompanying drawings in which FIGURE 1 shows one embodiment of the present invention, using mixed light, with a rod-shaped light-conducting body, FIGURE 1a is a sectional view taken on line 1a—1a of FIGURE 1, FIGURE 1b is a sectional view taken on line 1b—1b of FIGURE 1, FIGURE 2 is an end view of the device of FIGURE 1, FIGURE 3 is a modification of the device of FIGURE 1, in which a portion of the reflecting surface of the light-conducting body is formed in a specific shape, FIGURES 4 and 5 are two alternative forms of screens used for screening the reflecting surfaces, the screens being shown in an enlarged scale, FIGURE 6 shows the illumination of a large surface using a plurality of light-conducting bodies and light sources in accordance with the present invention, FIGURE 7 is a view in cross-section of the device shown in FIGURE 6, FIGURE 8 shows the illumination of a large instrument panel using the lighting system of the present invention, FIGURE 9 is a view in cross-section of the instrument panel shown in FIGURE 8, FIGURES 10 and 11 are wiring diagrams showing means for regulating the intensity of the light radiated by the systems, FIGURE 12 is one embodiment of the use of mixed light in a circular or ring-shaped light-conducting body, and FIGURE 13 is a view in cross-section of the device of FIGURE 12.

Referring to FIGURE 1, there is shown therein a simple embodiment of the present invention in which a plane surface 4 is desired to be lighted or illuminated according to the floodlight principle of the present invention. A rod or bar-shaped light-conducting body 1, having the longitudinal reflecting surfaces 1' and 1", extends approximately along one of the edges of the surface 4 and, at the end faces thereof, there are mounted the two light sources 2 and 6, respectively. The two light sources may be switched on either individually or collectively. When white light is employed in the light source 2 and this light source is switched on, the illumination of the surface 4 will be effected with white light by means of the light-conducting rod 1. The light source 6 mounted at the opposite end of the light-conducting body 1 is, in this case, a red incandescent lamp. When this lamp 6 is individually switched on, the surface 4 is illuminated with red light. To produce a mixture of light, the light sources 2 and 6 may be switched on collectively and a mixed light M, which is composed of red and white light, is then radiated on the surface 4. By regulating the intensity of the individual light sources, a continuous transition or blending of light may be obtained. Thus, all of the color gradations or shades of mixed light between pure white and pure red are obtainable as desired. The regulation of the intensity of the lights may be effected in a conventional manner, e.g. by a resistance control in the electric circuit or by means of mechanically actuated diaphragms and the like. One reflecting surface is provided in the light-conducting rod for each light source and the surface increases in width with increasing distance from the light source. In this manner, the absorption of the light in the light-conducting rod is compensated and the same amount of light is transmitted by the light-conducting rod to the surface to be illuminated regardless of the distance of the particular portion of the rod from the light source.

As shown in FIGURE 2, one light source is provided for each reflecting surface. These light sources are mounted in an offset or staggered relationship with respect to the reflecting surfaces. In the embodiment shown, the light-conducting body 1 is a round rod which is provided in a simple manner with two oppositely directed reflecting surfaces, which are formed by grinding, milling, or the like. As also shown in FIGURE 1, the reflecting surfaces may be formed by grinding the rod off, starting from each end of the round rod and working in a direction toward the opposite end thereof, the grinding or milling operation penetrating into the rod. This operation is effected in a manner such that the two resulting reflecting surfaces do not overlap or cross one another. Two oppositely disposed separate reflecting surfaces are visible in the top plan view. The closer the grinding or milling of the rod approaches the center of the rod, viewed in cross-section, the wider becomes the reflecting surface. In another embodiment, the round rod may be replaced by a different light-conducting body having a prismatic cross-section, for example.

FIGURE 3 discloses a modification of the lighting system of FIGURE 1 in which two white light sources 2 are disposed at each end of the light-conducting body 1. Differently colored light is obtained in this embodiment by using a portion of the surface of the light-conducting body formed in a particular manner and being positioned within the region or range of total reflection. This portion of the light-conducting body is colored, i.e., it is coated with a colored reflecting layer or the like. As a result of the total reflection, a mixed light illumination M is obtained here again over the entire surface 4. As shown in FIGURE 3, this specifically formed surface 8 provided with a colored reflecting layer may have a greater angle than the remainder of the reflecting surface. In the embodiment shown, one or both of the reflecting surfaces of the rod 1 may be provided with such a portion having a greater angle in various sections thereof. It is also possible to utilize this concept in generally known light-conducting bodies having one reflecting surface. By means of these sections having greater angles than the remainder of the reflecting surfaces, it becomes possible to specifically illuminate and emphasize important features on the indicating instrument to be illuminated.

The reflecting surfaces may be equipped with screens and two screen constructions are illustrated in FIGURES 4 and 5. These screens may also be covered with a colored coating or a metal layer.

FIGURE 6 shows the illuminating system of the present invention applied to the illumination of large surfaces. In this embodiment, several light rods 1 are arranged in a row above the surface 4 to be illuminated. One light source 2 is positioned between each pair of the light-conducting rods and, in order to obtain differently colored light, the color filters 3 are mounted adjacent alternate light sources, which are indicated with the reference numeral 2', at the end faces of alternate pairs of light-conducting bodies 1. White or colored mixed light is obtained depending upon whether the light sources 2 or 2' are switched on individually or collectively. The light-conducting rods 1 are formed as illustrated in FIGURE 1.

FIGURE 7 shows a view in cross-section of the arrangement of FIGURE 6 and shows the light sources 2 and the light-conducting bodies 1 being screened off by the cover 5, in the direction toward the viewer.

FIGURE 8 is a further development of the device shown in FIGURE 6 and shows a lighting or illuminating device for an instrument panel comprising the light-conducting bodies 1, the white light sources 2 and the colored light sources 6. Using this particular system, disturbances which might be produced by the malfunction of one or a small number of the light sources are effectively eliminated.

FIGURE 9 is a view in cross-section of the embodiment of FIGURE 8 and shows the provision of a screen 5 which extends over all of the light sources and the light-conducting bodies.

In FIGURE 10 there is shown a simplified wiring or circuit diagram for the most simple case of the illuminating circuit. All of the light sources are wired in parallel in a circuit including the current source 11, the switch 10 and the regulator 9. In this arrangement, the differently colored light sources 2 and 6 are arranged in a row between the individual light-conducting bodies 1, shown in phantom.

In FIGURE 11 there is a circuit showing a separate regulation of the differently colored light sources. As is apparent from the diagram, the white light sources are in circuit with the current source 11, switch 10, and the regulator 9, whereas the differently colored light sources 6 are in circuit with the current source 11, the switch 10', and the regulator 9'. Using this circuit, it is possible to obtain mixed light of any desired color tone. Reference numeral 1 designates the light-conducting bodies mounted between individual light sources, the bodies being shown in phantom.

FIGURE 12 shows a circular light-conducting body which is mounted around an indicating device 15. The light-conducting body 1 is provided with two separate reflecting surfaces 13 and 14, which are produced by grinding, milling or the like. The reflecting surface 13 is supplied with colored light from the light source 6 and the reflecting surface 14 is supplied with white light from the light source 2. A separating wall 12 is mounted between the light sources 2 and 6 for preventing a mutual influence or interference of the radiation into the reflecting surfaces. In this arrangement, it is possible to employ only a single light source for both reflecting surfaces and, in order to obtain a mixture of differently phased light, a color filter is mounted at one end face of the light-conducting body 1, as shown in FIGURE 6.

FIGURE 13 is a view in cross-section through the device of FIGURE 12 and a screen 16 for the light-conducting body 1 is shown in phantom. The upper left curvature of the light-conducting body is eliminated in this figure in order to show the arrangement of or mounting of the light sources 2 and 6. Also shown in phantom is the extension or course of the ground reflecting surface in the light-conducting body.

The arrangement of the present invention is suitable not only for the illumination of individual instruments but also may be employed for lighting instrument groups, as noted above. It is not necessary that the surfaces to be illuminated be planar but, instead, non-planar surfaces, portions of instruments or a complete equipment layout may be illuminated using the system of the present invention. In order to produce differently colored light, interchangeable color filters may be employed. Further, the rod-shaped light-conducting bodies need not be arranged only in a row as shown in FIGURE 6 but a closed arrangement forming a rectangle and being composed of several rod-shaped light-conducting bodies may be positioned around the periphery of a point or area to be illuminated. These latter may be screened off from the viewer in the same manner as shown in FIGURE 7. Also, it is possible to effect not only an illumination of an area from the periphery thereof by means of light-conducting bodies, but the light-conducting bodies themselves may also be the support for dials and the like in a conventional manner.

It will be obvious to those skilled in the art that many modifications may be made within the scope of the present invention without departing from the spirit thereof, and the invention includes all such modifications.

What is claimed is:

1. An illuminating system utilizing the floodlight principle comprising an elongated light-conducting body provided with light-reflecting surfaces extending from each end and to the center of the body, means for producing light rays at each end of the body, the light rays at one end being of different color from the rays at the other end, said light-reflecting surfaces each increasing in width with increasing distance from the respective light-producing means to provide uniform illumination, and means to independently vary the intensity of each light-producing means.

2. An illuminating system according to claim 1 in which a portion of at least one of the light-reflecting surfaces is provided with a color coating.

3. An illuminating system according to claim 1 in which a portion of at least one of the light-reflecting surfaces has a greater angle to the horizontal than the remainder thereof.

4. An illuminating system according to claim 1 in which at least one colored filter is interposed between at least one of the light-producing means and the light-conducting body.

5. An illuminating system according to claim 1 in which a plurality of light-conducting bodies are mounted in series with a light-producing means between each adjacent pair.

6. An illuminating system according to claim 1 in which the reflecting surfaces are covered by a screen.

7. An illuminating system according to claim 1 in which a plurality of light-conducting bodies are mounted in series at the periphery of an area to be illuminated, with a light-producing means between each pair of bodies, and a screen covering the light-conducting bodies and the light-producing means.

8. An illuminating system according to claim 1 and including means whereby the light-producing means may be turned on and off independently of each other.

References Cited by the Examiner

UNITED STATES PATENTS

| 2,121,132 | 6/1938 | Ryder. | |
| 2,140,972 | 12/1938 | Rylsky | 240—2.1 |
| 2,188,821 | 1/1940 | Rylsky | 240—2.1 |
| 2,207,117 | 7/1940 | Collins | 40—130 |
| 2,452,294 | 10/1948 | Dickson | 240—8.16 |
| 2,507,035 | 5/1950 | Maynard | 240—8.16 |
| 2,537,971 | 1/1951 | Dames | 240—8.16 |
| 2,553,285 | 5/1951 | Thomas | 88—24 |
| 2,589,569 | 3/1952 | Peter et al. | 240—1 X |
| 2,627,837 | 2/1953 | Ginter | 240—1 X |
| 2,689,948 | 9/1954 | Rothman | 240—1 X |
| 2,918,034 | 12/1959 | Neugass | 240—1 X |

FOREIGN PATENTS 31,104    8/1926    France.

NORTON ANSHER, *Primary Examiner.*